United States Patent [19]

Fukushima

[11] Patent Number: 5,692,163
[45] Date of Patent: Nov. 25, 1997

[54] PROCESS SYSTEM WHICH GENERATES SETS OF OUTPUT DATA FROM SETS OF PREDETERMINED INPUT DATA WITH DUPLICATE DATA

[75] Inventor: Masanobu Fukushima, Sanda, Japan

[73] Assignee: Ricoh Company, Ltd., Tokyo, Japan

[21] Appl. No.: 425,796

[22] Filed: Apr. 20, 1995

[30] Foreign Application Priority Data

Apr. 21, 1994 [JP] Japan .................................. 6-082783

[51] Int. Cl.$^6$ .................................................. G06F 13/00
[52] U.S. Cl. ......................... 395/511; 395/526; 345/201
[58] Field of Search ...................... 395/162–166, 395/427, 445, 501, 508, 511, 526; 345/185, 189–191, 200, 201

[56] References Cited

U.S. PATENT DOCUMENTS 5,388,204  2/1995  Ikeda et al. .......................... 395/162

FOREIGN PATENT DOCUMENTS 63-127365  5/1988  Japan ........................ G06F 15/32
64-17165   5/1989  Japan ........................ G06F 15/66
2-118782   5/1990  Japan ........................ G06F 15/66

*Primary Examiner*—Kee M. Tung
*Attorney, Agent, or Firm*—Cooper & Dunham LLP

[57] ABSTRACT

A processor system includes: an input data memory for storing a number of sets of predetermined input data to be processed, the input data including sets of original input data and sets of duplicate input data; a processing unit for generating a set of output data by processing each set of the input data, the processing unit generating sets of original output data from the sets of original input data; an output data memory for storing all sets of output data including the sets of original output data and sets of duplicate output data; an output data cache for storing the sets of the original output data output from the processing unit when the input data is detected as being the original input data; and a switching control unit for transferring the original output data stored in the output data cache into a location of the output data memory to store the duplicate output data, when the input data is detected as being the duplicate input data, and for transferring the original output data from the processing mean into a location of the output data memory to store the original output data, when the input data is detected as being the original input data.

15 Claims, 16 Drawing Sheets

FIG.2A  FIG.2B  FIG.2C  FIG.2D
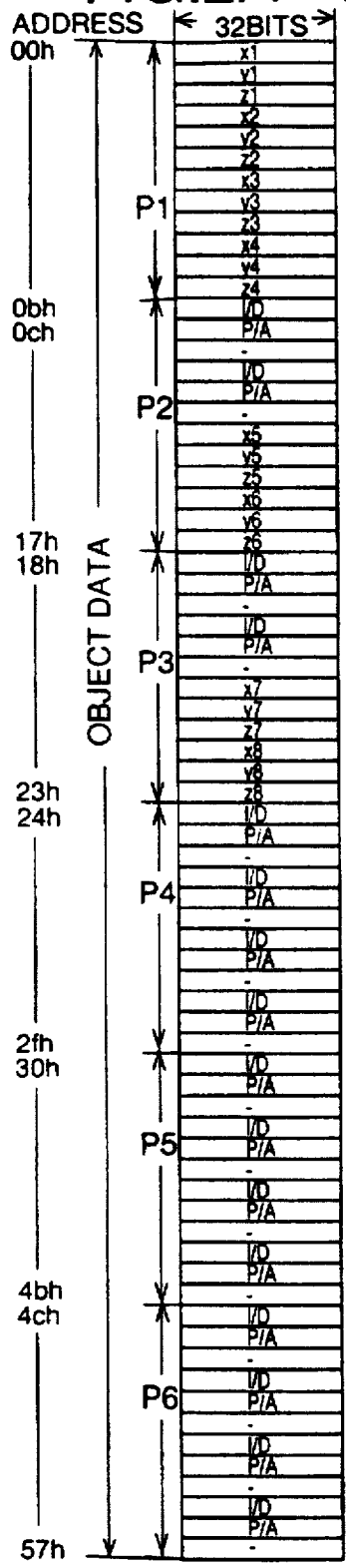
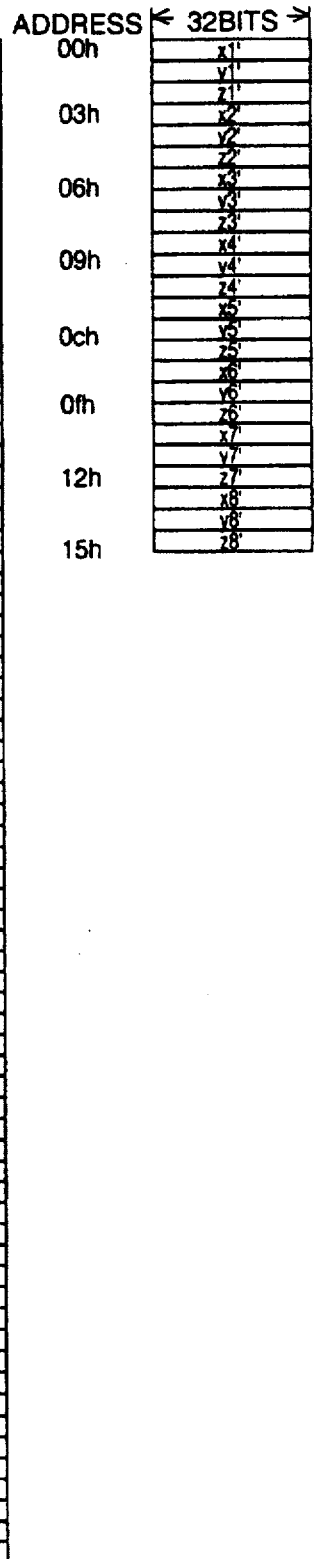
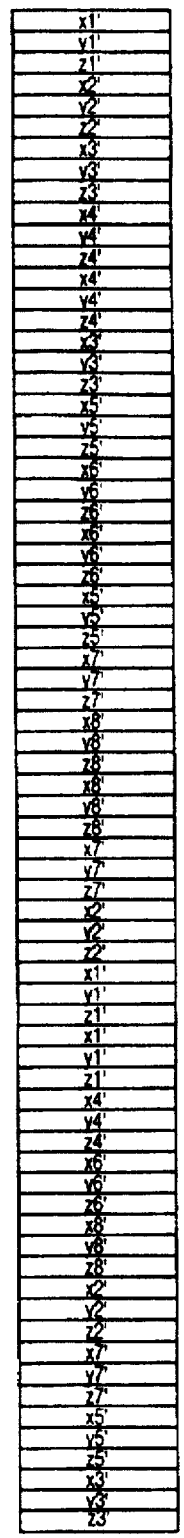
I/D = IDENTIFY DATA  P/A = POINTER ADDRESS

FIG.7A  FIG.7B  FIG.7C

FIG. 7A (ADDRESS, 32 BITS, OBJECT DATA):

| Address | Data |
|---|---|
| 00h | x1 |
|  | y1 |
|  | z1 |
| P1 | x2 |
|  | y2 |
|  | z2 |
|  | x3 |
|  | y3 |
|  | z3 |
|  | x4 |
|  | y4 |
| 0bh | z4 |
| 0ch | I/D |
|  | P/A |
|  | - |
|  | I/D |
|  | P/A |
| P2 | - |
|  | x5 |
|  | y5 |
|  | z5 |
|  | x6 |
|  | y6 |
| 17h | z6 |
| 18h | I/D |
|  | P/A |
|  | - |
|  | I/D |
|  | P/A |
| P3 | - |
|  | x7 |
|  | y7 |
|  | z7 |
|  | x8 |
|  | y8 |
| 23h | z8 |
| 24h | I/D |
|  | P/A |
|  | - |
|  | I/D |
|  | P/A |
| P4 | - |
|  | I/D |
|  | P/A |
|  | - |
| 2fh | I/D |
| 30h | P/A |
|  | - |
|  | I/D |
|  | P/A |
| P5 | - |
|  | I/D |
|  | P/A |
|  | - |
| 4bh | I/D |
| 4ch | P/A |
|  | - |
| P6 | I/D |
|  | P/A |
|  | - |
|  | I/D |
|  | P/A |
|  | - |
|  | I/D |
| 57h | P/A |
|  | - |

FIG. 7B:

c1000000h
41000000h
41000000h
c1000000h
c1000000h
41000000h
41000000h
c1000000h
41000000h
41000000h
41000000h
ffffffffh
09h
-
ffffffffh
06h
-
41000000h
c1000000h
c1000000h
41000000h
41000000h
c1000000h
ffffffffh
0fh
-
ffffffffh
0ch
-
c1000000h
c1000000h
c1000000h
c1000000h
41000000h
c1000000h
ffffffffh
15h
-
ffffffffh
12h
-
ffffffffh
03h
-
ffffffffh
00h
-
ffffffffh
00h
-
ffffffffh
09h
-
ffffffffh
0fh
-
ffffffffh
15h
-
ffffffffh
03h
-
ffffffffh
12h
-
ffffffffh
0ch
-
ffffffffh
06h
-

I/D = IDENTIFY DATA   P/A = POINTER ADDRESS

FIG.15A  FIG.15B  FIG.15C
PRIOR ART

PROCESS SYSTEM WHICH GENERATES SETS OF OUTPUT DATA FROM SETS OF PREDETERMINED INPUT DATA WITH DUPLICATE DATA

BACKGROUND OF THE INVENTION

The present invention relates to a processor system which generates a number of sets of output data by processing a number of sets of predetermined input data including duplicate input data in accordance with a predetermined operation.

Processor systems which decode an instruction and execute the instruction by processing a plurality of sets of input data in accordance with a predetermined operation have been applied to 3-dimensional geometry systems, driving simulators, and game machines. In these processor systems, the sets of input data are stored in an input data memory, and this memory is typically comprised of a ROM (read-only memory). The input data stored in the input data memory are fetched and processed with specified parameters in accordance with the predetermined operation to generate a plurality of sets of output data. The sets of output data resulting from the execution of the instruction are written to an output data memory. This output data memory is typically comprised of a RAM (random access memory).

FIG. 13 shows a conventional processor system of the type described above. In FIG. 13, sets of input data to be processed are stored in an input data memory 31. A read address generator 34 generates a read address which indicates a memory location of the input data memory 31 from which the input information is fetched.

The sets of input data fetched from the input data memory 31 are processed with predetermined parameters by a processing unit 32 in accordance with a predetermined algorithm. The processing unit 32 generates sets of output data as the result of the execution. This processing unit 32 is typically comprised of adders, subtracters, multipliers, dividers, registers (used to store the parameters), selectors, and a bus for interconnecting the above-mentioned components of the processor unit 32.

The sets of output data from the processing unit 32 are written to an output data memory 33. A write address generator 35 generates a write address which indicates a memory location of the output data memory 33 to which the output information from the processing unit 32 is written.

In FIG. 13, a program which describes the algorithm to be executed is stored in a program storage unit 36. This program defines how to process the input data with the parameters in order to generate the output data and how to use the hardware in order to execute the algorithm. The program stored in the program storage unit 36 is read out by the processor system, and a decoder 37 converts it into a sequence of tasks to be performed. A sequence controller 38 which controls operation of the entire processor system generates control signals in accordance with the sequence of tasks from the decoder 37. The control signals from the sequence controller 38 are sent to respective components of the processor system to control the respective operations of the components of the processor system.

Next, a description will be given of a conventional processor system applied to a geometric data processing unit of a 3-dimensional (3D) geometry system.

In this 3D geometry system, a number of sets of input data expressed in the terms of polygons are transformed through affine transformation into a number of sets of output data. This transformation allows the movement, rotation or other processing of a solid object displayed on a display device.

The data of a 3D object is comprised of a plurality of sets of x-, y- and z-coordinate values (x, y, z) which are stored as the input data in the input data memory 31. Examples of the 3D object for a driving simulator are: cars, trains, roads, traffic signals, mountains, rivers, bridges, etc. For the sake of simplicity, a case in which input data of a regular hexahedron (cube) is expressed in a floating-point format will be explained later.

FIGS. 14A and 14B show the object model of the regular hexahedron which is represented by the above-mentioned input data. FIG. 15A shows a memory map of the input data memory 31, FIG. 15B shows the contents of the input data memory 31 which are handled by a processor system, and FIG. 15C shows a memory map of the output data memory 33.

In FIGS. 14A and 14B, the object model of the regular hexahedron is comprised of six polygons P1 through P6. This object can be defined by eight edges which are described by eight sets of 3D coordinate values (x1, y1, z1) through (x8, y8, z8). However, the data of a single object of the hexahedron, stored within the conventional processor system, is comprised of 6 groups of polygon data each of which represents a single polygon. One polygon is defined by four edges which are described by 4 sets of 3D coordinate values. That is, a total of 72 (=6×4×3) 3D coordinate values must be stored within the system to define a single object of the hexahedron, as shown in FIGS.15A through 15C.

In the above-described 3D geometry system, performing clipping or mapping processes after the end of the geometric data processing is required. For this reason, it is necessary that the geometric data handled by the above processor system is expressed in the terms of polygon data. However, a very large quantity of the data must be processed on the above conventional processing system, which makes the performance of the processor system rather low.

FIG. 16 shows a 3D object data processing operation performed by the conventional processor system in FIG. 13. In FIG. 16, the conventional processor system, at step S101, reads an instruction from the program storage unit 36. Step S102 decodes the instruction into a sequence of tasks.

After the above step S102 is performed, step S103 reads from the input data memory 31 a value of x-coordinate input data (X data), step S104 reads a value of y-coordinate input data (Y data), and step S105 reads a value of z-coordinate input data (Z data).

After the above steps S103 through S105 are done, step S106 executes the instruction by processing the input data values in accordance with the sequence of tasks, so that a set of output data is generated by the processing unit 32.

The operation performed at the above step S106 includes: the scaling (enlargement/contraction) of the object, the rotation of the object, the global coordinate stretching, the perspective affinity transformation, or the like. The amount of data which must be processed at this step is relatively large. However, for the sake of convenience, only one block of the step S106 is shown in FIG. 16.

After the above step S106 is performed, step S107 writes to the output data memory 33 a value of x-coordinate output data (X' data) from the processing unit 32. Step S108 writes to the output data memory 22 a value of y-coordinate output data (Y' data) from the processing unit 32. Step S109 writes to the output data memory 22 a value of z-coordinate output data (Z' data) from the processing unit 32.

After the steps S107 through S109 are performed, step S110 detects whether a specified number of all the sets of the input data to be processed is reached. If the result at the step S110 is negative, the preceding steps starting from the above step S103 is repeated. If the result at the step S110 is affirmative, the 3D object data processing operation, shown in FIG. 16, is ended.

In the 3D object data processing operation described above, suppose that the reading of a piece of the input data (each of the steps S103–S105) takes 1 clock cycle, the data processing (the step S106) takes 44 clock cycles, and the writing of a piece of the output data (each of the steps S107–S109) takes 1 clock cycle. A time needed for generating a single set of the output data related to a single edge of the regular hexahedron would be 50 (=3+44+3) clock cycles. Therefore, a total time needed for generating 24 sets of the output data related to all the edges of the regular hexahedron would be 1200 (=50×24) clock cycles.

The throughput of processor systems, which is the amount of data processed in a specified amount of time, is a measure of evaluation of the performance of the individual processor systems. Various techniques for increasing the throughput of processor systems have been proposed which follows.

1. One of the techniques mentioned above is to increase the input/output access speeds between the input data memory and the processing unit and between the processing unit and the output data memory. For example, a high-speed static RAM (SRAM) is used rather than the slower speed and cheaper dynamic RAM (DRAM), or a multiple-line data bus is used to interconnect the components.

2. Another technique is to use the pipelining process in which a long task is divided into components, and each component is distributed to one processor. A new task can begin even though the former tasks have not been completed. In the pipelined operation, different components of different tasks are executed at the same time by different processors.

3. Still another technique is to use a large scale integrated circuit (LSI) to which many functions of the processor system are distributed. However, the cost of the manufacture is high.

4. A further technique is to use a program that describes one iteration of the algorithm by using vector instructions, rather than another equivalent program that describes multiple iterations of the same algorithm. This technique also increases the throughput but it is not adequate for processing a number of sets of predetermined input data including duplicate data in accordance with a predetermined operation.

5. Another technique is to use the hardware which carries out parallel processing, that is, using different processors in which processing of multiple tasks is performed independently by the processors. This increases the throughput, but the cost of the hardware is very high.

Also, other techniques for increasing the throughput of a processor system are disclosed in the following publications.

Japanese Laid-Open Patent Application No.63-127365 discloses a system which performs coordinate transformation at high speed wherein the number of multiplications required for the coordinate transformation is reduced by executing vector instructions.

Japanese Laid-Open Patent Application No.2-118782 discloses a method of processing a picture in which the affine transformation of an original picture is executed at high speed by assigning components of the affine transformation to a plurality of different processors.

Japanese Laid-Open Patent Application No.64-17165 discloses a picture processor system which executes affine transformation of a picture at high speed by inserting an FIFO register into a picture element transfer line connected with plural processor elements.

When a number of sets of predetermined input data including duplicate data are processed on the above conventional processor systems in accordance with a predetermined operation, it is difficult to efficiently generate a number of sets of output data from the sets of the input data including duplicate data. Also, the above conventional systems have a complex structure, and it is difficult to realize the above-mentioned function of the systems with a low cost.

SUMMARY OF THE INVENTION

Accordingly, it is a general object of the present invention to provide an improved apparatus and method in which the above-described problem is eliminated.

Another object of the present invention is to provide a processor system which is constructed with a simple structure and can reduce the total time required to generate a number of sets of output data by processing sets of input data including duplicate data in accordance with a predetermined operation.

Still another object of the present invention is to provide a processor system which realizes a high speed processing of input data including duplicate data in which sets of output data are efficiently generated without using expensive hardware or software.

The above-mentioned object of the present invention is achieved by a processor system which generates a number of sets of output data by processing a number of sets of predetermined input data including duplicate data in accordance with a predetermined operation, the processor system including: an input data memory for storing the sets of predetermined input data to be processed, the predetermined input data including sets of original input data and sets of duplicate input data; a processing unit for generating a set of output data by processing each set of the input data from the input data memory, the processing unit generating sets of original output data from the sets of original input data; an output data memory for storing all the sets of the output data including the sets of original output data and sets of duplicate output data, each set of the duplicate output data being a duplicate of a corresponding set of the original output data; an output data cache for storing the sets of the original output data which are output from the processing unit when the input data read from the input data memory is detected as being the original input data; and a switching control unit for transferring the original output data stored in the output data cache into a location of the output data memory to store the duplicate output data, when the input data read from the input data memory is detected as being the duplicate input data, and for transferring the original output data output from the processing mean into a location of the output data memory to store the original output data, when the input data read from the input data memory is detected as being the original input data.

The above-mentioned object of the present invention is achieved by a processor system which generates a number of sets of output data by processing a number of sets of predetermined input data including duplicate data in accordance with a predetermined operation, the processor system including: an input data memory for storing the sets of predetermined input data to be processed, the predetermined input data including sets of original input data and sets of duplicate input data; a processing unit for generating a set of output data by processing each set of the input data from the input data memory, the processing unit generating sets of original output data from the sets of original input data; an output data memory for storing all the sets of the output data including the sets of original output data and sets of duplicate output data, each set of the duplicate output data being a duplicate of a corresponding set of the original output data; a data register for temporarily storing a set of the original output data which is output from the output data memory when the input data read from the input data memory is detected as being the duplicate input data; and a switching control unit for transferring the original output data temporarily stored in the data register into a location of the output data memory to store the duplicate output data, when the input data read from the input data memory is detected as being the duplicate input data, and for transferring the original output data output from the processing mean into a location of the output data memory to store the original output data, when the input data read from the input data memory is detected as being the original input data.

The above-mentioned object of the present invention is achieved by a processor system which generates a number of sets of output data by processing a number of sets of predetermined input data including duplicate data in accordance with a predetermined operation, the processor system including: an input data memory for storing the sets of predetermined input data to be processed, the predetermined input data including sets of original input data and sets of duplicate input data, each set of the duplicate input data being indicated by a non-numeric value and a pointer address; a processing unit for generating a set of output data by processing each set of the input data from the input data memory, the processing unit generating sets of original output data from the sets of original input data; an output data memory for storing all the sets of the output data including the sets of original output data and sets of duplicate output data, each set of the duplicate output data being a duplicate of a corresponding set of the original output data; and a switching control unit for transferring the duplicate input data included in the input data into a location of the output data memory to store the duplicate input data, when the input data read from the input data memory is detected as being the duplicate input data, and for transferring the original output data output from the processing mean into a location of the output data memory to store the original output data, when the input data read from the input data memory is detected as being the original input data.

According to the present invention, the processor system generates sets of output data by processing sets of predetermined input data including duplicate data in accordance with a predetermined operation. The sets of output data from the processor system are supplied to a next-process processor. When the input data read from the input data memory is detected as being the duplicate input data, the data processing of the input data is inhibited, and the original output data, already stored, is written to the output data memory. Thus, the number of sets of the input data which must be processed by the processing unit is reduced, and the total time needed for generating all the sets of output data can be reduced.

BRIEF DESCRIPTION OF THE DRAWINGS

Other objects, features and advantages of the present invention will be more apparent from the following detailed description when read in conjunction with the accompanying drawings in which:

FIGS. 2A, 2B, 2C and 2D are diagrams showing a memory map of an input data memory, the contents of the input data memory, a memory map of an output data cache, and a memory map of an output data memory, respectively;

FIGS. 7A, 7B and 7C are diagrams showing a memory map of an input data memory, the contents of the input data memory, and a memory map of an output data memory, respectively;

FIG. 15A, 15B and 15C are diagrams showing a memory map of an input data memory, the contents of the input data memory, and a memory map of an output data memory, respectively.

DESCRIPTION OF THE PREFERRED EMBODIMENTS

A description will now be given of a processor system in a first embodiment of the present invention, with reference to FIGS. 1 through 3.

Figure 1:
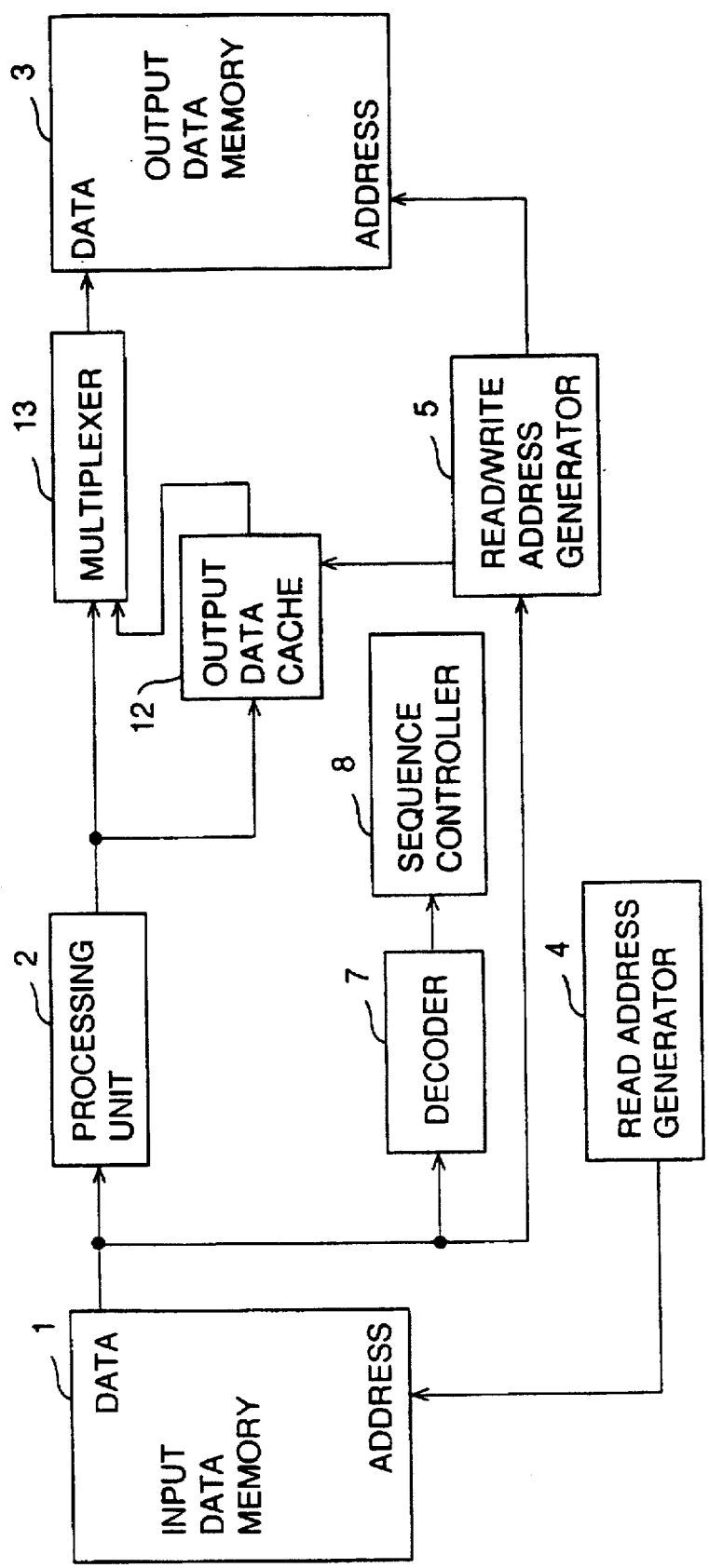
FIG. 1 is a block diagram showing a processor system in one embodiment of the present invention.
Figure 13:
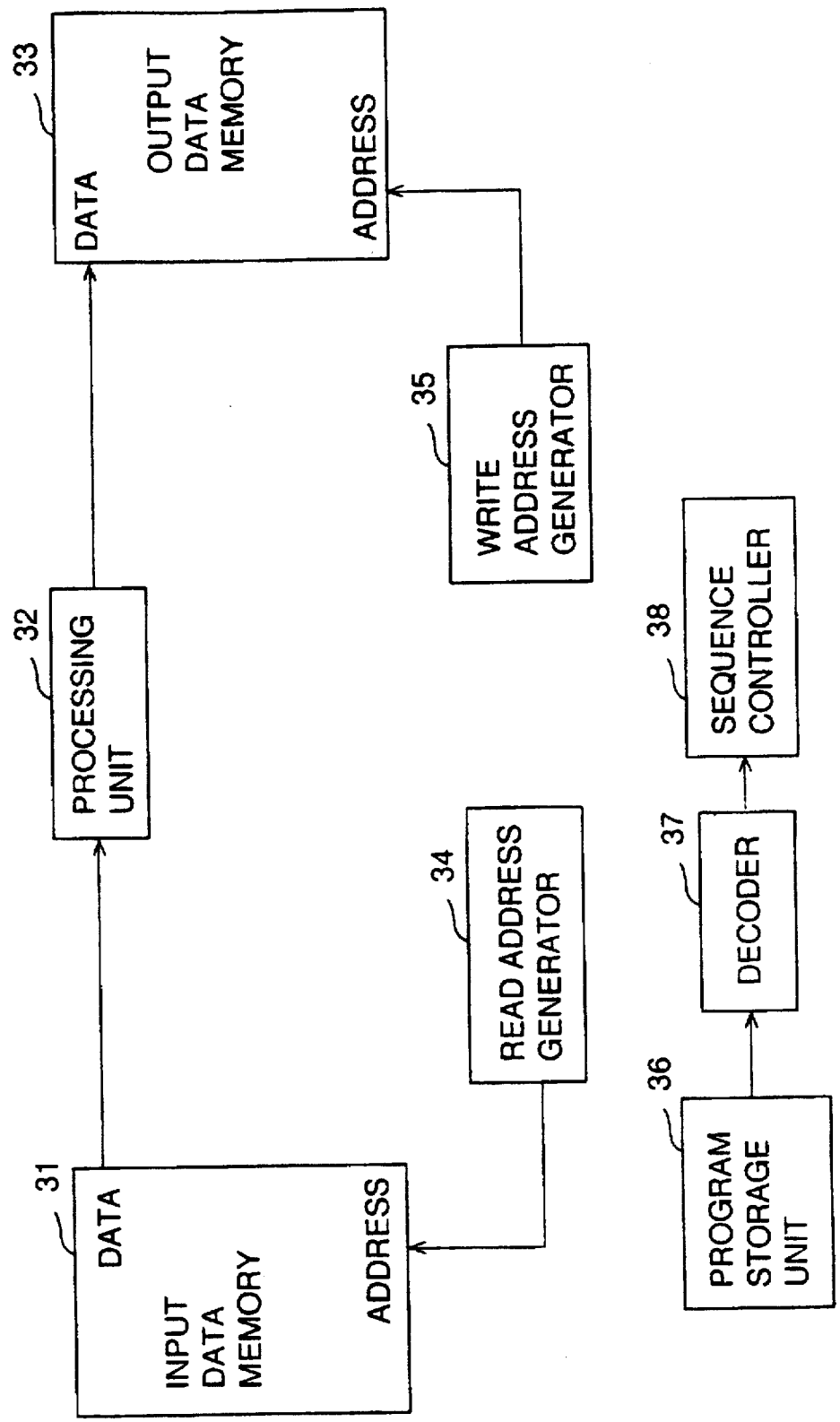
FIG. 13 is a block diagram showing a conventional processor system.
Figure 14A:
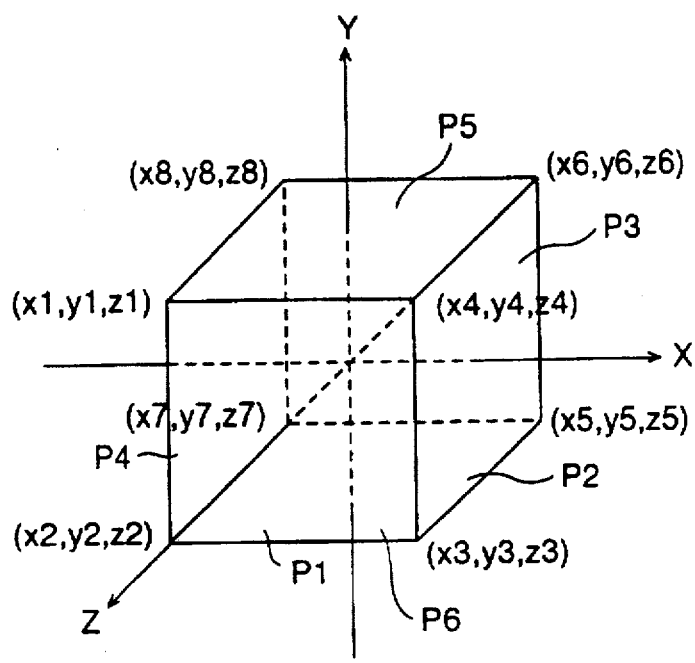
FIGS. 14A and 14B are representations of a 3D object model of a regular hexahedron.
Figure 14B:
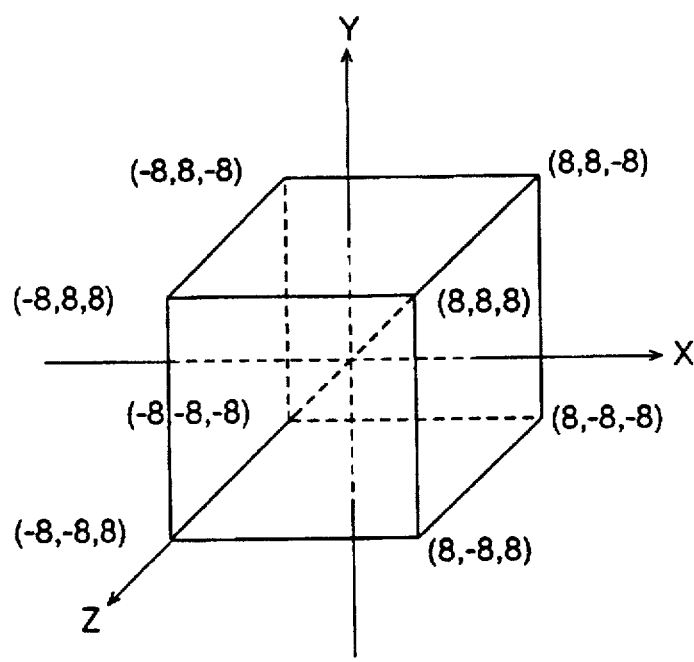

FIG. 1 shows the processor system in this embodiment of the present invention. In this processor system in FIG. 1, the program storage unit of the conventional processor system in FIG. 13 is omitted for the sake of convenience. In the following, only the differences between the present invention and the prior art will be explained.

The processor system in FIG. 1 includes an input data memory 1, a processing unit 2, an output data memory 3, a read address generator 4, a read/write address generator 5, a decoder 7, a sequence controller 8, an output data cache 12, and a multiplexer 13.

The contents of the input data memory 1 are different from the contents of the input data memory 31, which will be explained later. In the processor system in FIG. 1, an output of the input data memory 1 is connected to an input of the processing unit 2. An output of the processing unit 2 is connected to an input of the output data cache 12 and to an input of the multiplexer 13, and an output of the output data cache 12 is connected to an input of the multiplexer 13.

An output of the multiplexer 13 is connected to an input of the output data memory 3.

Further, in the processor system in FIG. 1, the output of the input data memory 1 is connected to an input of the decoder 7. An output of the decoder 7 is connected to an input of the sequence controller 8. Also, the output of the input data memory 1 is connected also to an input of the read/write address generator 5, an output of the read/write address generator 5 is connected to an input of the output data cache 12, and an output of the read/write address generator 5 is connected to an input of the output data memory 3. Accordingly, the input data from the input data memory 1 is supplied to the decoder 7 and to the read/write address generator 5.

Figures 15A, 15B, 15C:
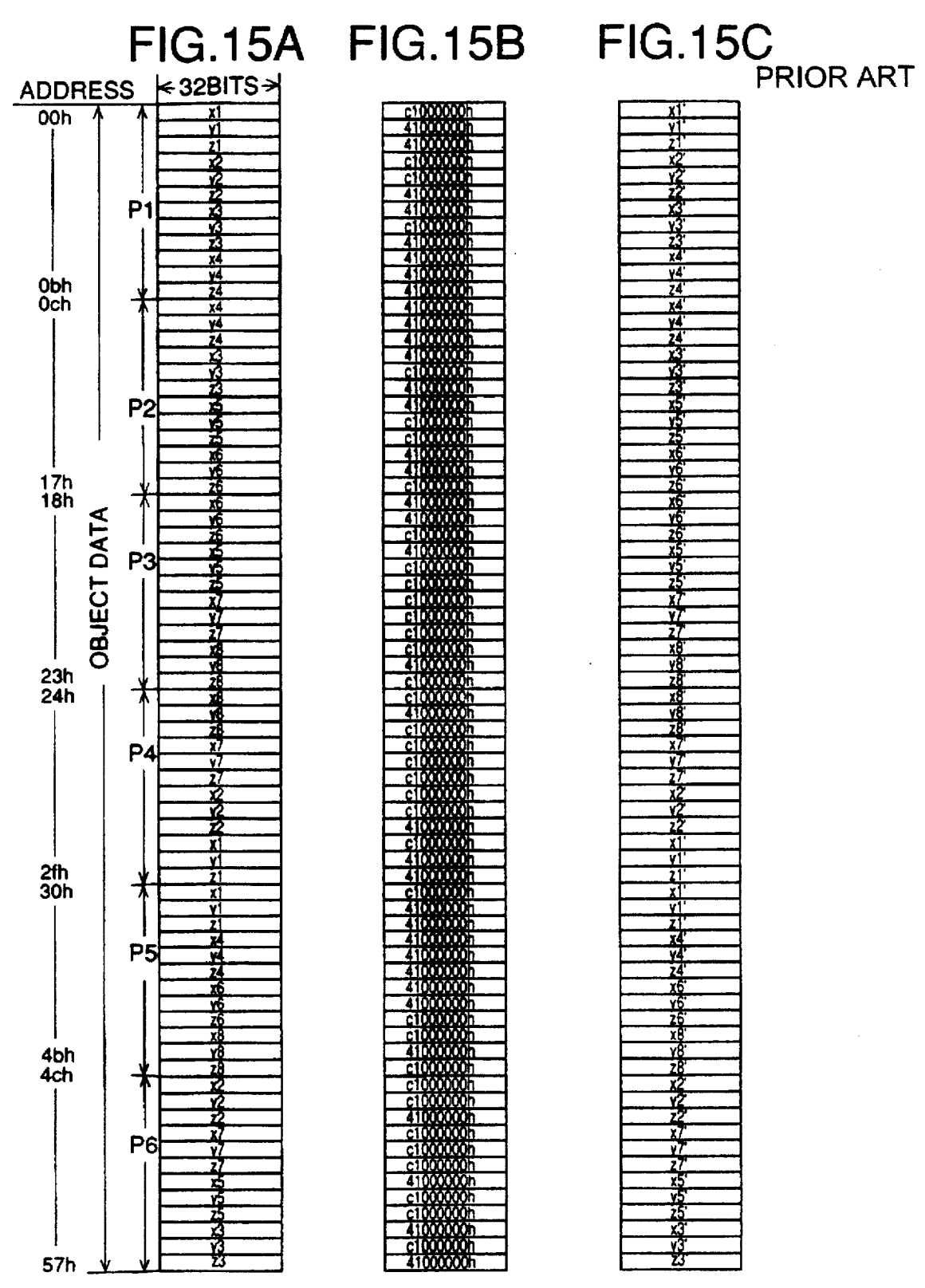

FIG. 2A shows a memory map of the input data memory 1, and FIG. 2B shows the contents of the input data memory 1 in a case of the 3D object data of the regular hexahedron (cube). For the sake of convenience, the contents of the input data memory 1 in FIG. 2B correspond to the contents of the input data memory 31 in FIG. 15B except for the differences which will be described below.

As described above, the 3D object data of the regular hexahedron is comprised of six groups of polygon data P1 through P6, each of the polygon data being represented by four sets of edge data. Each set of the edge data of the regular hexahedron is comprised of three coordinate values (x, y, z).

In the input data memory 31 of the conventional processing system, the sets of input data including 8 sets of original input data and 16 sets of duplicate input data (second and subsequent occurrences of the same edge data) are stored, and they are in accordance with the predetermined operation performed by the conventional processing system.

However, in the input data memory 1 of the processing system in FIG. 1, the sets of input data including 8 sets of the original input data and 16 sets of identify data and their pointer addresses which substitute for the duplicate input data, are stored. The identity data and their pointer addresses are also known as substitute duplicate input data.

In the case of FIG. 2A, all the four sets of the edge data in the polygon data P1 are stored as the original input data in the input data memory 1 since there is no duplicate input data. However, the two sets of the edge data (x4, y4, z4) and (x3, y3, z3) in the polygon data P2 are the duplicate input data which are the same as corresponding edge data in the polygon data P1, and the other sets of the edge data (x5, y5, z5) and (x6, y6, z6) in the polygon data P2 are the original input data. Thus, the input data of the polygon data P2 stored in the input data memory 1 are: the identify data and its pointer address which substitute for the edge data (x4, y4, z4); the identify data and its pointer address which substitute for the edge data (x3, y3, z3); and the two sets of the original input data (x5, y5, z5) and (x6, y6, z6). Each of the identify data is stored at a memory location of the input data memory 1 for each x-coordinate value of the edge data. Each of the pointer address is stored at a memory location of the input data memory 1 for each y-coordinate value of the edge data. For the duplicate input data stored in the input data memory 1 for each z-coordinate value of the edge data in this embodiment, no care is taken as indicated in FIG. 2A.

The reason why the contents of the input data memory in this embodiment of the present invention can be set to those described above is that the operation performed by the processing unit when the sets of input data are processed is predetermined. The identify data and the pointer addresses described above can be generated by finding the common edges of two sets of polygon data in the regular hexahedron, by using an object modeling tool.

The input data stored at each location of the input data memory 1 is a floating-point hexadecimal number with 32 bit length. The identify data stored in the input data memory 1 in this embodiment, as shown in FIG. 2B, may be the non-numeric value "ffffffffh" which is equivalent to the NAN (not a number) according to the IEEE standard 754. However, another code may be used as the identify data.

The pointer address stored in the input data memory 1 in this embodiment indicates a specific memory location of the output data cache 12 at which corresponding original output data is stored.

FIG. 2C shows a memory map of the output data cache 12. In the output data cache 12, only eight sets of original output data (x1', y1', z1') through (x8', y8', z8') included in the output data from the above processing unit 2 are stored. Apart from the above original output data, 16 sets of duplicate output data included in the output data from the processing unit 2 (which correspond to the duplicate input data) are not stored in the output data cache 12.

FIG. 2D shows a memory map of the output data memory 3. In the output data memory 3, all the 24 sets of the output data output from the above processing unit 2 are stored. Thus, the output data stored in the output data memory 3 include the 8 sets of the original output data and the 16 sets of the duplicate output data. The contents of the output data memory 3 in this embodiment are the same as the contents of the output data memory 33 of the conventional system in FIG. 15C. In other words, these sets of the output data read from the output data memory 3 are processed by a next-process processor.

In the processor system 1 of this embodiment shown in FIG. 1, each set of the input data read from the input data memory 1 is supplied to the processing unit 2, to the decoder 7, and to the read/write address generator 5.

The decoder 7 detects whether the input data read from the input data memory 1 is the substitute duplicate input (the identify data) or the original input data. If the input data from the input data memory 1 is a numerical value, the decoder 7 outputs a signal indicating that the input data is detected as being the original input data. If the input data from the input data memory 1 is the non-numeric value (or the identify data), the decoder 7 outputs a signal indicating that the input data is detected as being the substitute duplicate input data. The above-mentioned signal from the decoder 7 is supplied to the sequence controller 8.

The read/write address generator 5 generates a write address indicating a location of the output data cache 12 to which the output information from the processing unit 2 is written when the input data is detected as being the original input data. Based on the pointer address read from the input data memory 1 after the input data is detected as being the identify data, the read/write address generator 5 generates a read address indicating a location of the output data cache 12 from which the output information stored in the output data memory 3 is read out. Further, the read/write address generator 5 generates a write address indicating a location of the output data memory 3 to which the output information from the processing unit 2 is written via the multiplexer 13 when the input data is detected as being the original input data.

In accordance with the result of the detection of the input data, one of the two inputs of the multiplexer 13 is selected. That is, whether the output data output from the processing unit 2 is written to the output data memory 3 or the output data stored in the output data cache 12 is written to the output data memory 3 depends on whether the input data is detected as being the original input data or the substitute duplicate input data (the identify data).

The sequence controller 8 controls the operation of the entire processor system. In the sequence controller 8 of this embodiment, when the input data is detected as being the substitute duplicate input data (or the identify data), the sequence controller 8 allows the read address generator 4 to output an incremented read address indicating a location of the input data memory 1 next to the memory location of the previously read input data. The sequence controller 8 at this time inhibits the processing unit 2 from performing the predetermined operation. A pointer address of the duplicate output data which indicates a specific memory location of the output data cache 12 is immediately read from the input data memory 1. Also, the cache-side input of the two inputs of the multiplexer 13 is immediately selected. The read/write address generator 5 generates a read address relating to the location of the output data cache 12 which is indicated by the pointer address supplied from the input data memory 1, and generates a write address relating to the location of the output data memory 3. Accordingly, the output data is read from the output data cache 12 in accordance with the read address from the read/write address generator 5, and the output data is written to the output data memory 3 via the multiplexer 13 in accordance with the write address from the read/write address generator 5.

Figure 3:
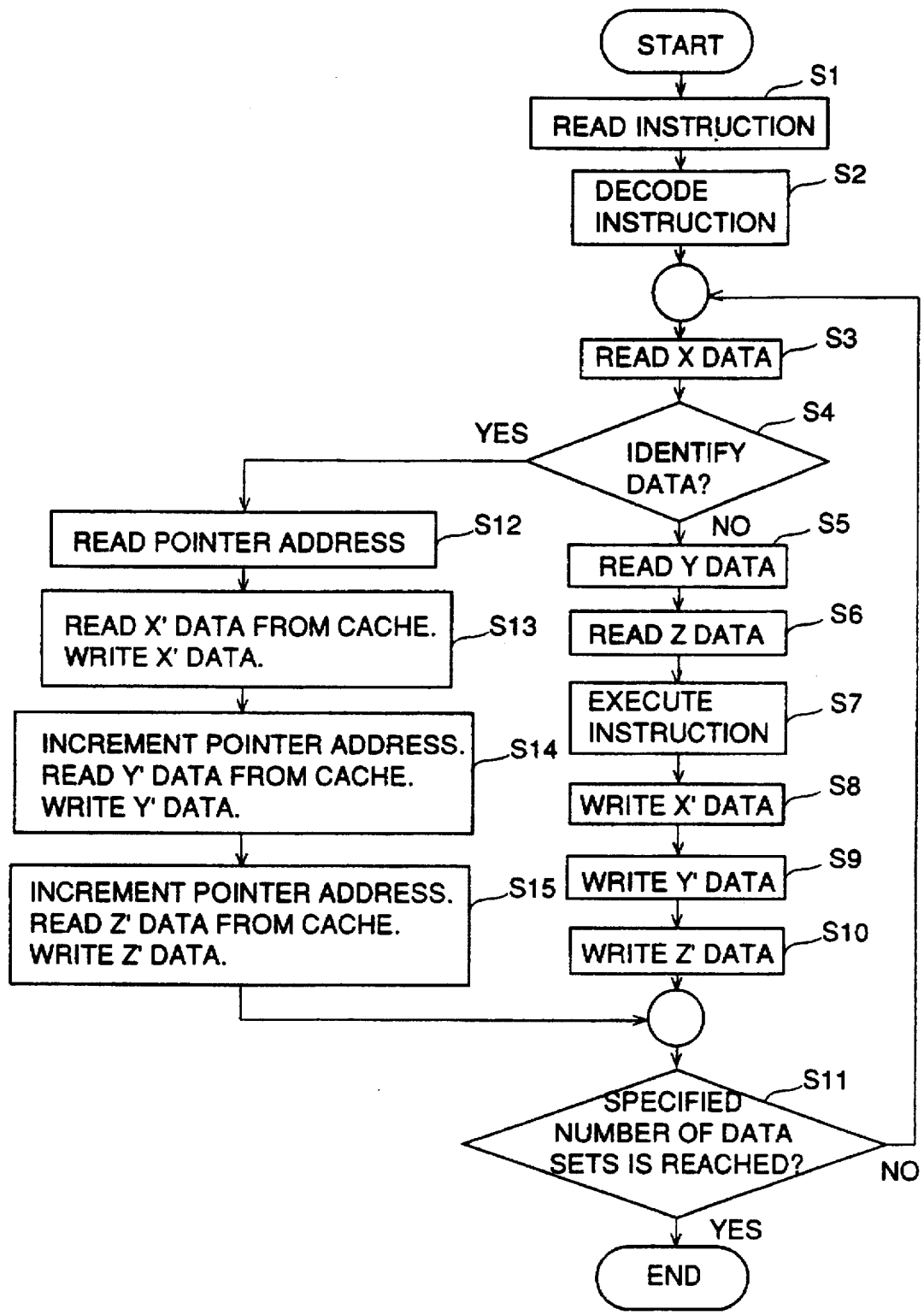
FIG. 3 is a flow chart for explaining an operation performed by the processor system in FIG. 1.

FIG. 3 shows a 3D object data processing operation performed by the processor system of this embodiment in FIG. 1. In this data processing operation, step S1 reads an instruction, and step S2 decodes the instruction into a sequence of tasks. Step S3 reads x-coordinate input data (X data) from the input data memory 1.

After the X data is read at the above step S3, step S4 detects whether the read X data is the identify data or not.

If the result at the above step S4 is negative (i.e., the X data is the original input data), the following steps S5 through S10 are sequentially performed. Step S5 reads a piece of y-coordinate input data (Y data) from the input data memory 1, and step S6 reads a piece of z-coordinate input data (Z data) therefrom. Step S7 executes the instruction based on one set of the input data including the x-, y-, and z-coordinate input data being read out, to generate one set of x-coordinate output data (X' data), y-coordinate output data (Y' data), and z-coordinate output data (Z' data).

After the above step S7 is performed, step S8 writes the X' data to both the output data cache 12 and the output data memory 3. Step S9 writes the Y' data to both the output data cache 12 and the output data memory 3. Step S10 writes the Z' data to both the output data cache 12 and the output data memory 3.

On the other hand, if the result at the above step S4 is affirmative (i.e., the x-coordinate input data is the identify data), the following steps S12 through S15 are sequentially performed. Step S12 increments the read address from the read address generator 4, and reads a pointer address of the identify data from the input data memory 1. Step S13 reads the X' data from the output data cache 12 at the memory location indicated by the above pointer address, and writes the X' data to the output data memory 3 via the multiplexer 13. The write address of the output data memory 3 at this time is indicated by a signal output from the read/write address generator 5.

Further, step S14 increments the pointer address, reads the Y' data from the output data cache 12 at the memory location indicated by that pointer address, and writes that Y' data to the output data memory 3 via the multiplexer 13. Step S15 further increments the pointer address, reads the Z' data from the output data cache 12 at the memory location indicated by that pointer address, and writes that Z' data to the output data memory 3 via the multiplexer 13.

After the step S10 or the step S15 is performed, step S11 detects whether a specified number of all the sets of the input data to be processed is reached. If the result at the step S11 is negative, the procedure starting from the above step S3 is repeated. If the result at the step S11 is affirmative, the 3D object data processing operation, shown in FIG. 3, is ended.

Figure 16:
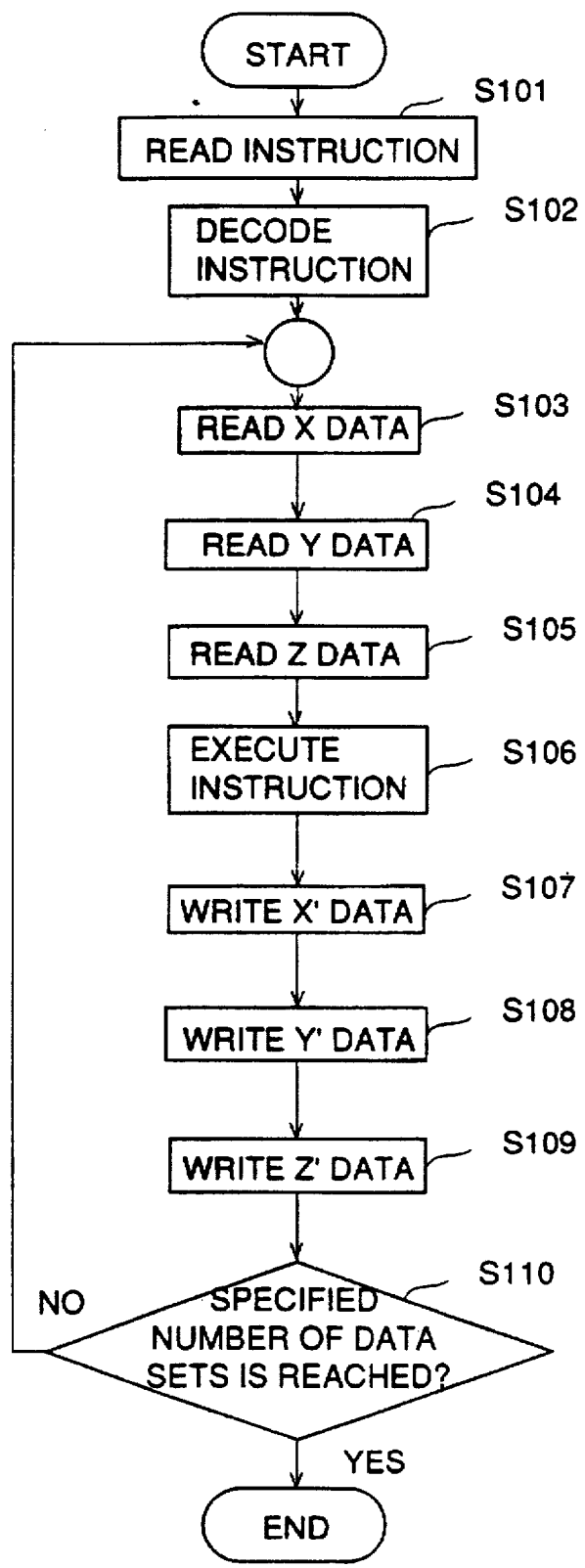
FIG. 16 is a flow chart for explaining an operation performed by the conventional processor system in FIG. 13.

To compare a total time needed for generating 24 sets of the output data in this embodiment with the case of the conventional processor system in FIG. 16, suppose that the reading of a piece of the input data takes 1 clock cycle, the decoding takes no clock cycle, the data processing takes 44 clock cycles, and the reading and writing of a piece of the output data takes 1 clock cycle. A time needed for generating a set of the output data related to a single edge of the regular hexahedron requiring the data processing (the original output data) would be 50 (=3+44+3) clock cycles, and a time needed for generating a set of the output data related to a single edge of the regular hexahedron requiring no data processing (the duplicate data) would be 5 (=2+3) clock cycles. Therefore, a total time needed for generating 24 sets of the output data related to all the edges of the regular hexahedron would be 480 (=50×8+5×16) clock cycles.

Accordingly, in this embodiment, if the input data read from the input data memory 1 is the original input data to be processed, the processing of the input data is carried out by the processing unit 2, and the output data from the processing unit 2 is written to the output data memory 3 and to the output data cache 12. If the input data read from the input data memory 1 is the substitute duplicate input data (or the identify data), the output data read from the output data cache 12 is written to the output data memory 3. Therefore, the total time needed for generating the sets of the output data in this embodiment can be remarkably shortened.

In addition, the identify data whose format is the same as that of the data being processed is decoded by the decoder 7 to make a decision on whether the data processing or the output data reading and writing is selected. It is not necessary that the conditional branch is carried out by checking a special flag whose format is not the same as that of the data being processed to proceed to a next data flow. The total time needed for generating the sets of the output data in this embodiment is remarkably shortened.

Next, a description will be given of a processor system in a second embodiment of the present invention, with reference to FIGS. 4 and 5.

Figure 4:
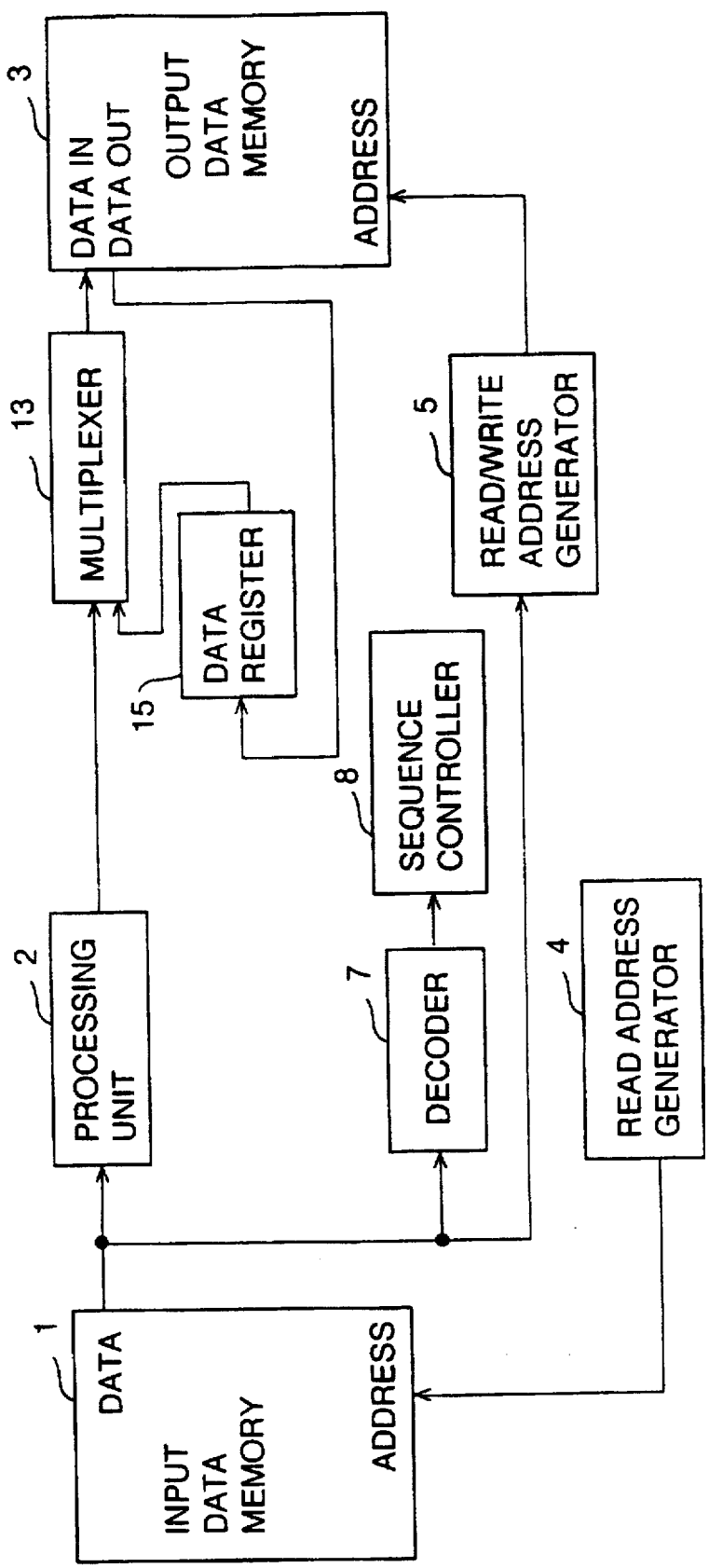
FIG. 4 is a block diagram showing a processor system in another embodiment of the present invention.

FIG. 4 shows the processor system in this embodiment. In this processor system in FIG. 4, the program storage unit in FIG. 13 is omitted for the sake of convenience. In the following, only the differences between this embodiment and the first embodiment will be explained.

The processor system in FIG. 4 includes a data register 15 in place of the output data cache 12 of the first embodiment. The other components of the processor system in this embodiment are the same as corresponding components of the processor system in FIG. 4. The sequence controller 8 controls the operation of the entire processor system in FIG. 4 such that the output data read from the data register 15 is written to the output data memory 3 when the input data is the substitute duplicate input data.

The contents of the input data memory 1 in this embodiment are the same as the contents of the input data memory 1 in FIG. 1. In the processor system in FIG. 4, the output of the processing unit 2 is connected to the input of the multiplexer 13, and an output of the data register 15 is connected to the other input of the multiplexer 13. The output of the multiplexer 13 is connected to an input (DATA IN) of the output data memory 3. An output (DATA OUT) of the output data memory 3 is connected to an input of the data register 15. The output of the read/write address generator 5 is connected to the other input (ADDRESS) of the output data memory 3.

In the processor system in FIG. 4, the output data is read out from the output data memory 3 and temporarily stored in the data register 15 when the input data read from the input data memory 1 is detected as being the duplicate input data by the decoder 7.

Similarly to the first embodiment described above, the decoder 7 in FIG. 4 detects whether the input data read from the input data memory 1 is the substitute duplicate input data or the original input data. If the input data from the input data memory 1 is a numerical value, the decoder 7 outputs a signal indicating that the input data is detected as being the original input data. If the input data from the input data memory 1 is the non-numeric value, the decoder 7 outputs a signal indicating that the input data is detected as being the substitute duplicate input data. The above-mentioned signal from the decoder 7 is supplied to the sequence controller 8.

The read/write address generator 5 in FIG. 4 generates a write address indicating a location of the output data memory 3 to which the output information from the processing unit 2 is written via the multiplexer 13, when the input data is detected as being the original input data. On the other hand, when the input data is detected as being the substitute duplicate input data (or the identify data), the read/write address generator 5 generates a read address indicating a location of the output data memory 3 from which the output data stored in the output data memory 3 is read out, based on the pointer address read from the input data memory 1. Further, the read/write address generator 5 generates a write address indicating a location of the output data memory 3 to which the output data from the data register 15 is written via the multiplexer 13, when the input data is detected as being the duplicate input data.

In accordance with the result of the detection of the input data, one of the two inputs of the multiplexer 13 is selected. That is, whether the output data output from the processing unit 2 is written to the output data memory 3 or the output data stored in the data register 15 is written to the output data memory 3 depends on whether the input data is detected as being the original input data or the substitute duplicate input data (the identify data).

Figure 5:
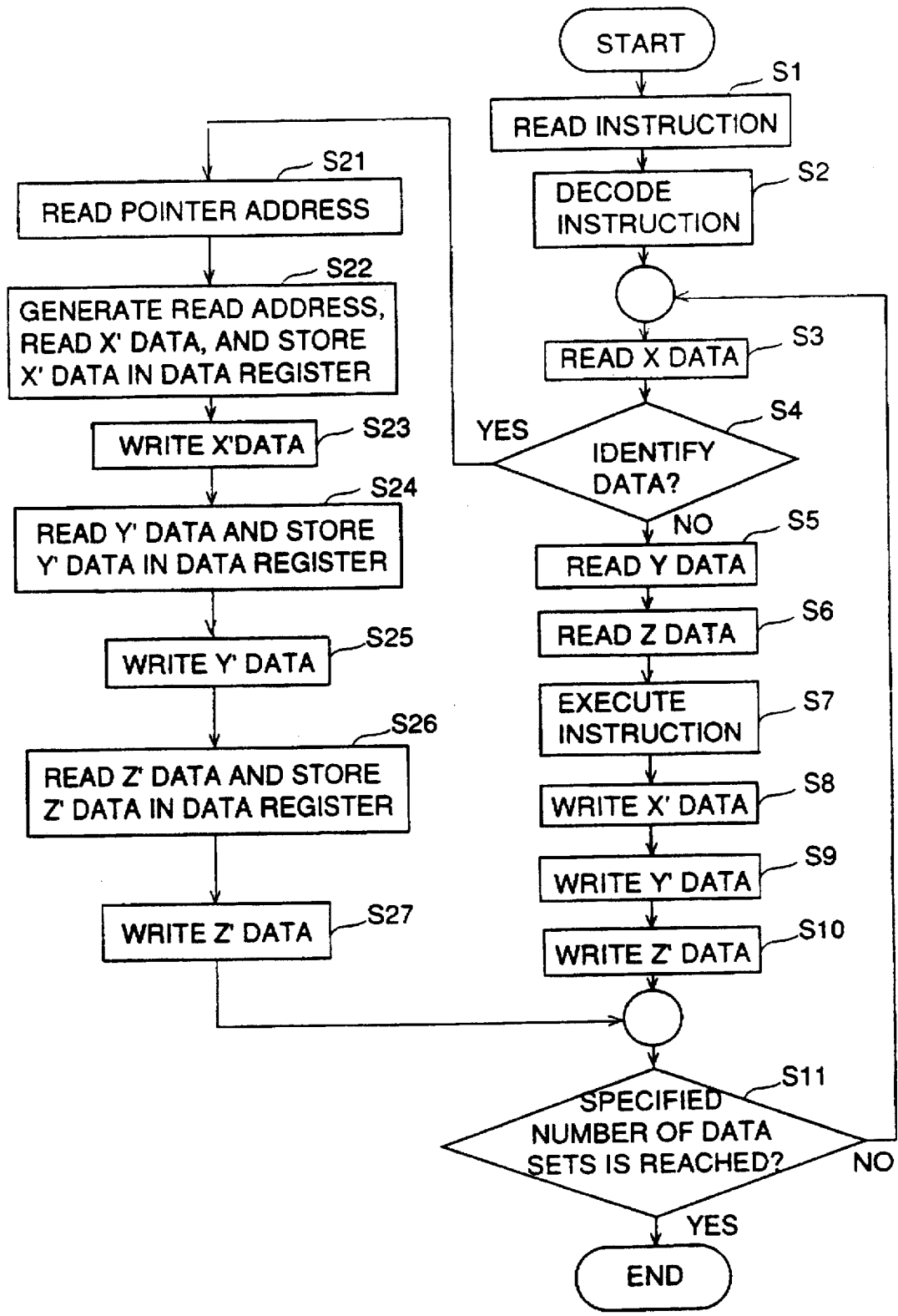
FIG. 5 is a flow chart for explaining an operation performed by the processor system in FIG. 4.

FIG. 5 shows a 3D object data processing operation performed by the processor system in FIG. 4. In FIG. 5, the steps S1 through S11 are the same as corresponding steps in FIG. 3, and a description thereof will be omitted.

In FIG. 5, the steps S21 through S27 are performed when the input data read from the input data memory 1 is detected at the step S4 as being the duplicate input data (or the identify data). Step S21 reads a pointer address from the input data memory 1. Step S22 generates the read address based on the pointer address, and reads the output data (X' data) from the output data memory 3, and stores the output data in the data register 15. Step S23 writes the output data (X' data), stored in the data register 15, to the output data memory 3 via the multiplexer 13 at the write address from the read/write address generator 5. Steps S24 and S25 related to the reading and writing of Y' data and steps S26 and S27 related to the reading and writing of Z' data are performed in a manner similar to the steps S22 and S23 described above.

To compare a total time needed for generating 24 sets of the output data in this second embodiment with the case of the first embodiment in FIG. 3, suppose that the reading of a piece of the input data takes 1 clock cycle, the decoding takes no clock cycle, the data processing takes 44 clock cycles, the reading and storing of a piece of the output data takes 1 clock cycle, and the writing of a piece of the output data takes 1 clock cycle. A time needed for generating a set of the output data related to one edge of the regular hexahedron requiring the data processing (the original output data) would be 50 (=3+44+3) clock cycles, and a time needed for generating a set of the output data related to one edge of the regular hexahedron requiring no data processing (the duplicate data) would be 8 (=2+2×3) clock cycles. Therefore, a total time needed for generating 24 sets of the output data related to all the edges of the regular hexahedron would be 528 (=50×8+8×16) clock cycles.

Accordingly, in this second embodiment, if the input data read from the input data memory 1 is the original input data to be processed, the processing of the input data is carried out by the processing unit 2, and the output data from the processing unit 2 is written to the output data memory 3 via the multiplexer 13. If the input data read from the input data memory 1 is the duplicate input data (or the identify data), the output data read from the output data memory 3 is stored in the data register 15, and the output data from the data register 15 is written to the output data memory 3 via the multiplexer 13. Therefore, the total time needed for generating the sets of the output data in this embodiment can be shortened.

Next, a description will be given of a processor system in a third embodiment of the present invention, with reference to FIGS. 6 through 8.

Figure 6:
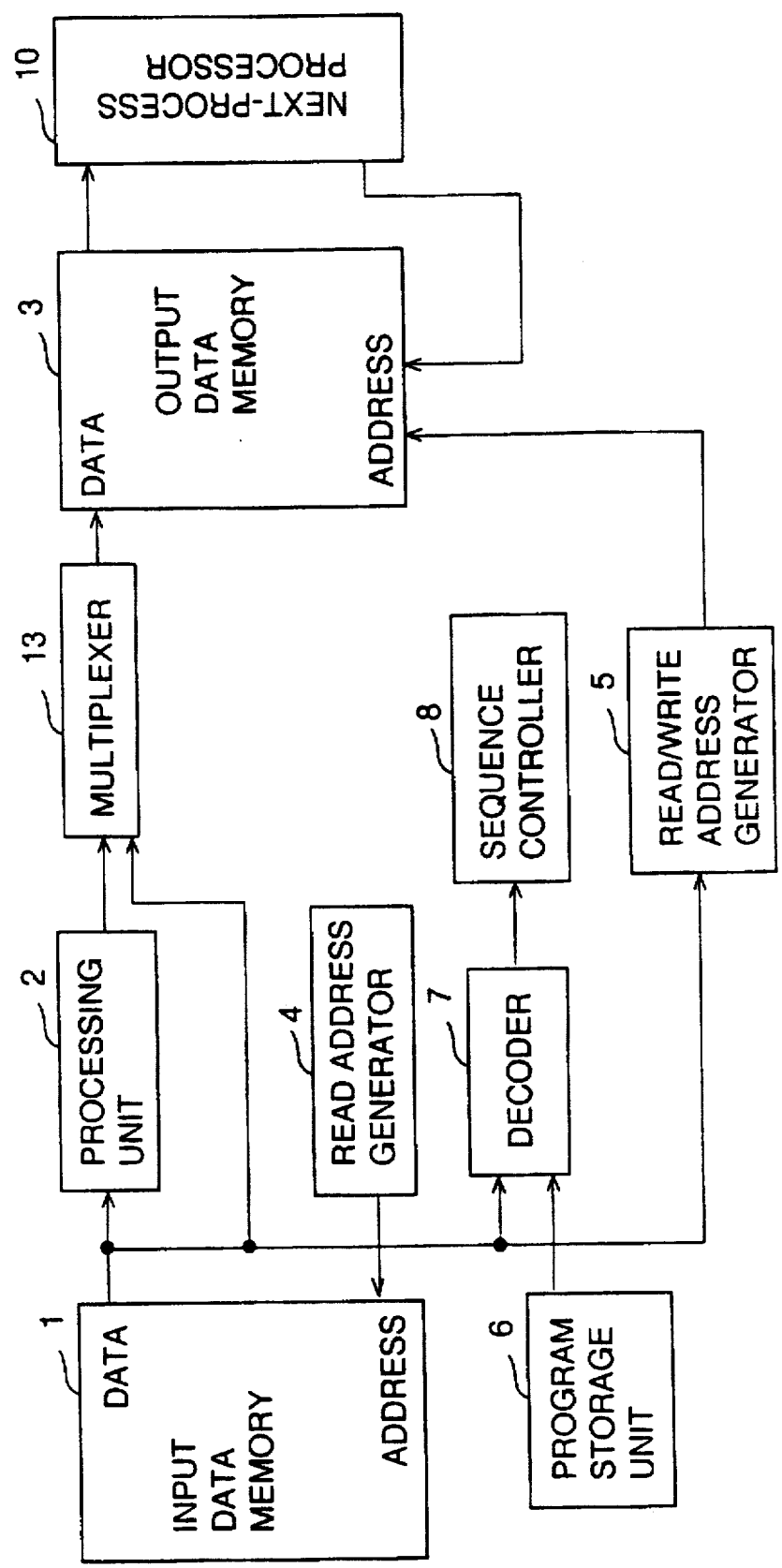
FIG. 6 is a block diagram showing a processor system in still another embodiment of the present invention.

FIG. 6 shows the processor system in this embodiment. In the following, the differences between this embodiment and the first embodiment will be explained.

The processor system in FIG. 6 includes neither the output data cache 12 in the first embodiment nor the data register 15 in the second embodiment. The output of the input data memory 1 is connected to an input of the multiplexer 13, and the output of the processing unit 2 is connected to the other input of the multiplexer 13. Therefore, the output data (the original output data) from the processing unit 2 is supplied to the output data memory 3 via the multiplexer 13, and the identify data and the pointer address read from the input data memory 1 are supplied to the output data memory 3 via the multiplexer 13.

The other components of the processor system in this embodiment are the same as corresponding components of the processor system in FIG. 4. The sequence controller 8 controls the operation of the entire processor system in FIG. 6 such that the identify data and the pointer address read from the input data memory 1 are written to the output data memory 3 when the input data is detected as being the substitute duplicate input data.

Figures 7A, 7B, 7C:
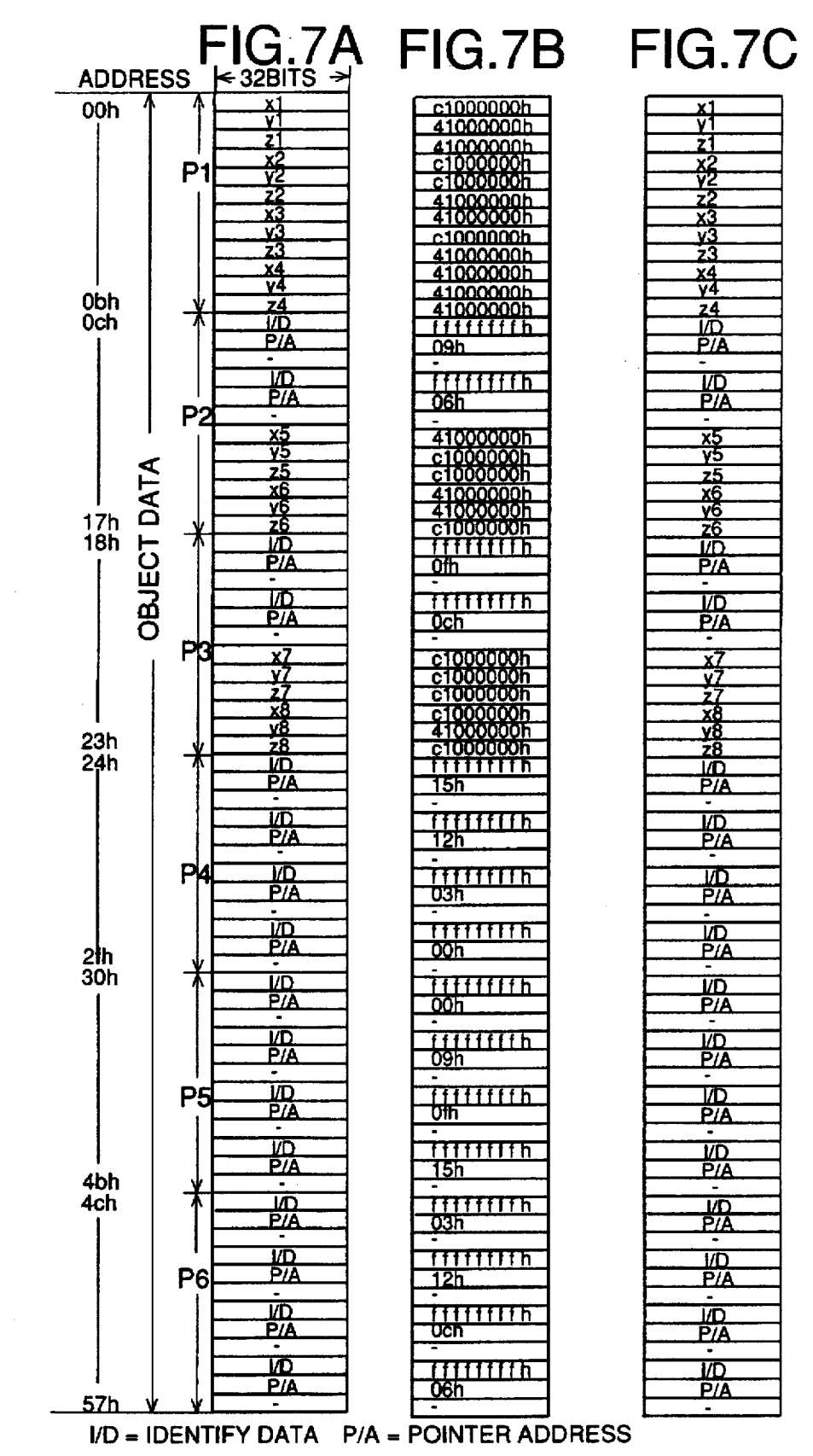

FIGS. 7A, 7B and 7C show a memory map of the input data memory 1, the contents of the input data memory 1, and a memory map of the output data unit 3, respectively. The contents of the input data memory 1 in this embodiment are the same as the contents of the input data memory 1 shown in FIG. 2B. However, the contents of the output data memory 3 in this embodiment are different from the contents of the output data memory 3 in the first and second embodiments mentioned above.

In this third embodiment, when the input data read from the input data memory 1 is detected as being the substitute duplicate input data, the input data (the identify data and the pointer address) is directly written to the output data memory 3 without performing the data processing.

Figure 8:
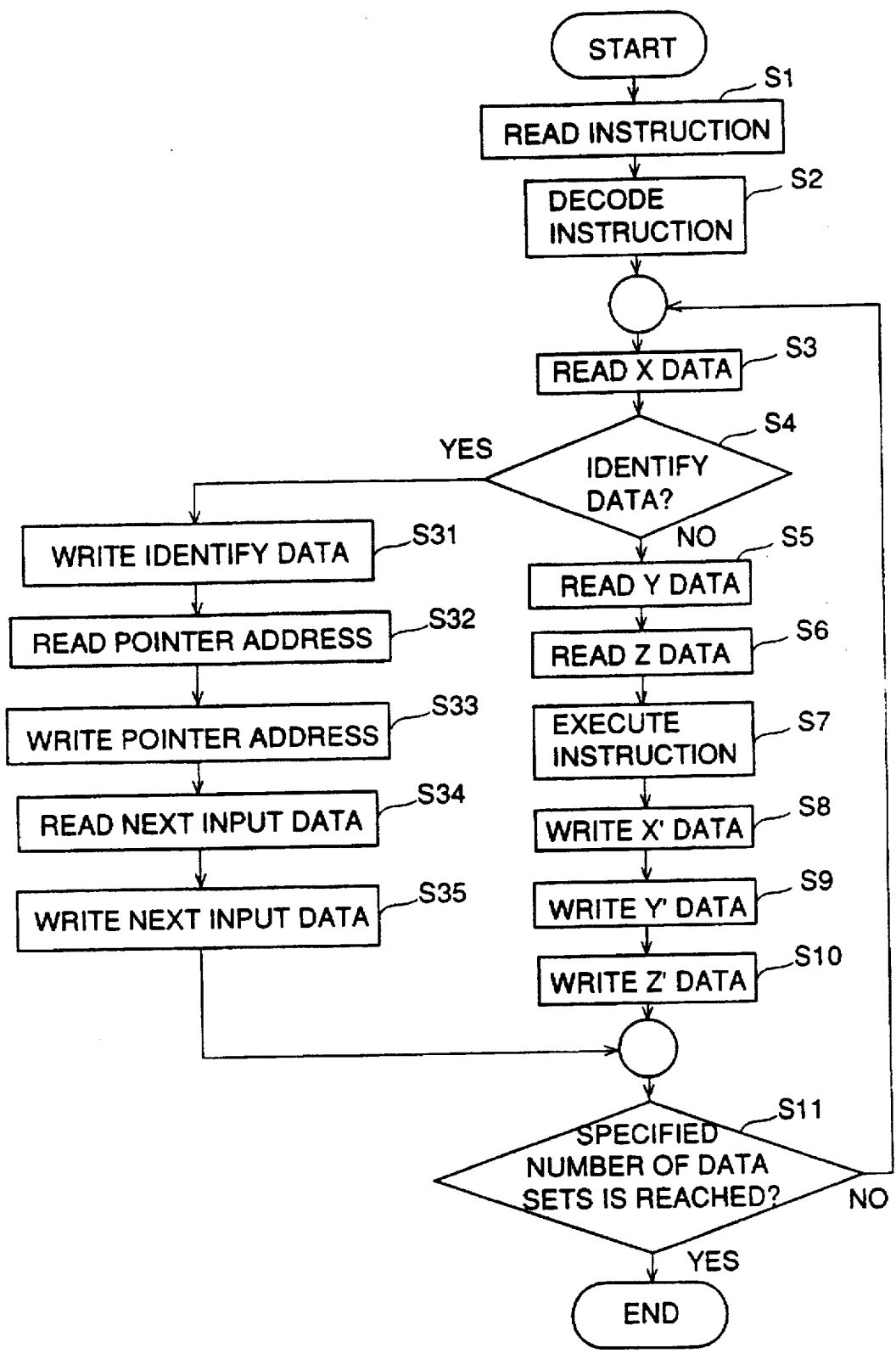
FIG. 8 is a flow chart for explaining an operation performed by the processor system in FIG. 6.

FIG. 8 shows a 3D object data processing operation performed by the processor system in FIG. 6. The steps S1 through S11 in FIG. 8 are the same as corresponding steps in FIG. 3, and a description thereof will be omitted.

In the operation in FIG. 8, the steps S31 through S35 are performed when the input data is detected at the step S4 as being the substitute duplicate input data. Step S31 writes the identify data, read from the input data memory 1, to the output data memory 3. Step S32 reads the pointer address from the input data memory 1. Step S33 writes the read pointer address to the output data memory 3. Step S34 reads the input data from the input data memory 1. Step S35 writes the read input data to the output data memory 3.

To compare a total time needed for generating 24 sets of the output data in this embodiment with the case of the first embodiment in FIG. 3, suppose that the reading of a piece of the input data takes 1 clock cycle, the decoding takes no clock cycle, the data processing takes 44 clock cycles, and the writing of a piece of the output data takes 1 clock cycle. A time needed for generating a set of the output data related to one edge of the regular hexahedron which requires the data processing (the original output data) would be 50 (=3+44+3) clock cycles, and a time needed for generating a set of the output data related to one edge of the regular hexahedron which requires no data processing (the duplicate data) would be 3 clock cycles. Therefore, a total time needed for generating 24 sets of the output data related to all the edges of the regular hexahedron would be 448 (=50×8+3× 16) clock cycles.

Accordingly, in this third embodiment, if the input data read from the input data memory 1 is the original input data to be processed, the processing of the input data is carried out by the processing unit 2, and the output data from the processing unit 2 is written to the output data memory 3 via the multiplexer 13. If the input data read from the input data memory 1 is the substitute duplicate input data (or the identify data), the input data is directly written to the output data memory 3 via the multiplexer 13. Therefore, the total time needed for generating the sets of the output data in this embodiment can be remarkably shortened.

In the above-described third embodiment, it is necessary to provide a next-process processor 10 which includes another decoder and another read address generator. This decoder of the next-process processor 10 is used to detect whether the output data, read from the output data memory 3, is the original output data or the duplicate output data (or the identify data). Also, this read address generator of the next-process processor 10 is used to generate a read address indicating a location of the output data memory 3 from which the output information is read out by the next-process processor 10.

In the above-described third embodiment, it is not necessary to provide the output data cache 12 of the first embodiment or the data register 15 of the second embodiment. The size of the processor system in this embodiment can be reduced to a size smaller than that of the first and second embodiments.

In the flow chart of the third embodiment in FIG. 8, the steps S34 and S35 are performed to read the input data (whose location follows the memory location of the pointer address) from the input data memory 1 and write the read input data to the output data memory 3. If the format of the data handled by the next-process processor 10 is changed to match with the format of the output data generated by the processor system in this embodiment, these steps S34 and S35 may be omitted. If such a change is done, the total processing time of the third embodiment can be further shortened. Also, the storage capacity of each of the input data memory 1 and the output data memory 3 can be reduced.

In the first through third embodiments described above, the identify data which indicates the duplicate input data and the pointer address which indicates the location of the output data in a memory are stored in the input data memory 1. However, in another embodiment, these data may be supplied to the processor system from another database unit via the sequence controller 8.

Next, a description will be given of a processor system in a fourth embodiment of the present invention, with reference to FIGS. 9 through 12.

Figure 9:
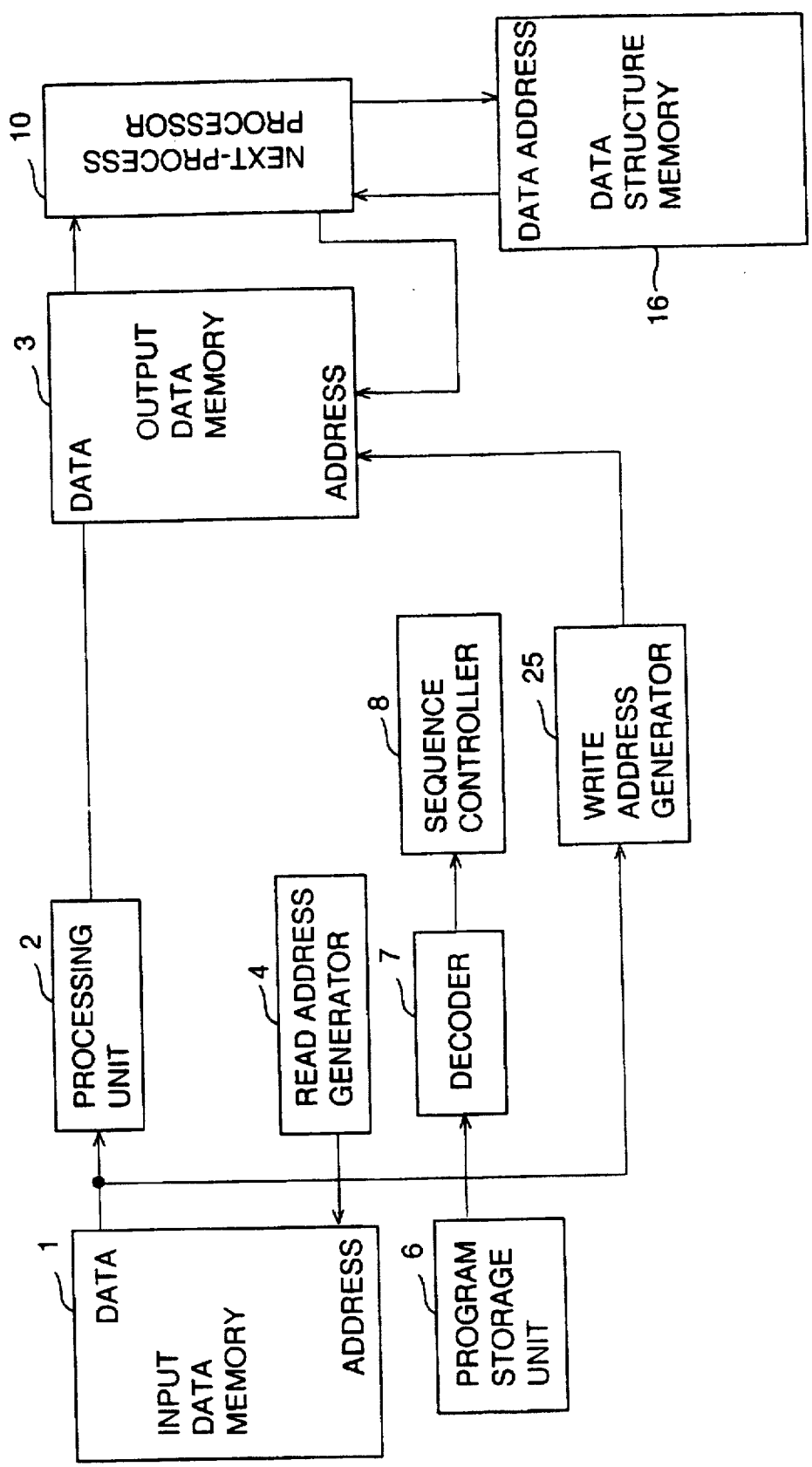
FIG. 9 is a block diagram showing a processor system in another embodiment of the present invention.

FIG. 9 shows the processor system in this embodiment. The processor system in FIG. 9 includes the input data memory 1, the processing unit 2, the output data memory 3, the read address generator 4, a write address generator 25, the program storage unit 6, the decoder 7, the sequence controller 8, a next-process processor 10, and a data structure memory 16.

The input data memory 1 and the output data memory 3 in FIG. 9 are different from the corresponding units of the previously-described embodiments. In the input data memory 1, only the original input data without the duplicate data is stored. In the output data memory 3, only the original output data without the duplicate data is stored.

The processor system in FIG. 9 does not include the multiplexer 13, the output data cache 12, or the data register 15. The output of the processing unit 2 is connected to the input of the output data memory 3. The output of the output data memory 3 is connected to an input (DATA) of the next-process processor 10. The next-process processor 10 includes two inputs and two outputs. An output of the data structure memory 16 is connected to the other input (DATA) of the next-process processor 10. The original output data from the output data memory 3 is supplied to the next-process processor 10. The data from the data structure memory 16 is supplied to the next-process processor 10.

In addition, in the processor system in FIG. 9, one output of the next-process processor 10 is connected to an input (ADDRESS) of the output data memory 3, and the other output of the next-process processor 10 is connected to an input (ADDRESS) of the data structure memory 16.

In the data structure memory 16, a number of reading sequence indexes are stored. These indexes in the data structure memory 16 are read out by the next-process processor 10 to generate a number of sets of output data including the original output data and the duplicate output data from the original output data read from the output data memory 3.

Figures 10A, 10B, 10C, 10D:
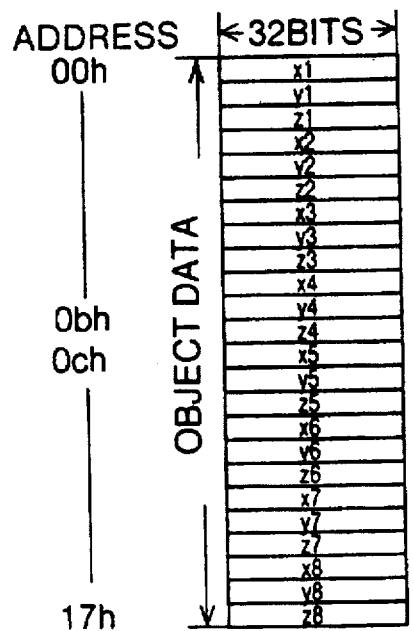
FIGS. 10A, 10B, 10C and 10D are diagrams showing a memory map of an input data memory, the contents of the input data memory, a memory map of an output data memory, and the contents of a data structure memory, respectively.

FIG. 10A shows a memory map of the input data memory 1, and FIG. 10B shows the contents of the input data memory 1. For the sake of convenience, the contents of the input data memory 1 in FIG. 10B correspond to the contents of the input data memory 1 in FIG. 2B.

Similarly to the previous embodiments, the 3D object data of the regular hexahedron is comprised of six groups of polygon data P1 through P6, each of the polygon data being represented by four sets of edge data. Each set of the edge data is comprised of three coordinate values (x, y, z). The input data memory 1 in this embodiment, as shown in FIG. 10A and 10B, includes only 8 sets of the edge data (which correspond to the original input data) without 16 sets of the duplicate input data. The sets of the edge data shown in FIG. 10B can be generated by finding the common edges of respective two adjacent polygons in the regular hexahedron by using the object modeling tool.

FIG. 10C shows a memory map of the output data memory 3, and FIG. 10D shows the contents of the data structure memory 16. The contents of the output data memory 3 in this embodiment, as shown in FIG. 10C, correspond to the contents of the input data memory 1. The reading sequence indexes stored in the data structure memory 16, as shown in FIG. 10D, correspond to identifiers of respective four edges which constitute each of the six polygons P1 through P6 of the regular hexahedron. The reading sequence indexes can also be generated by using the object modeling tool mentioned above.

Figure 11:
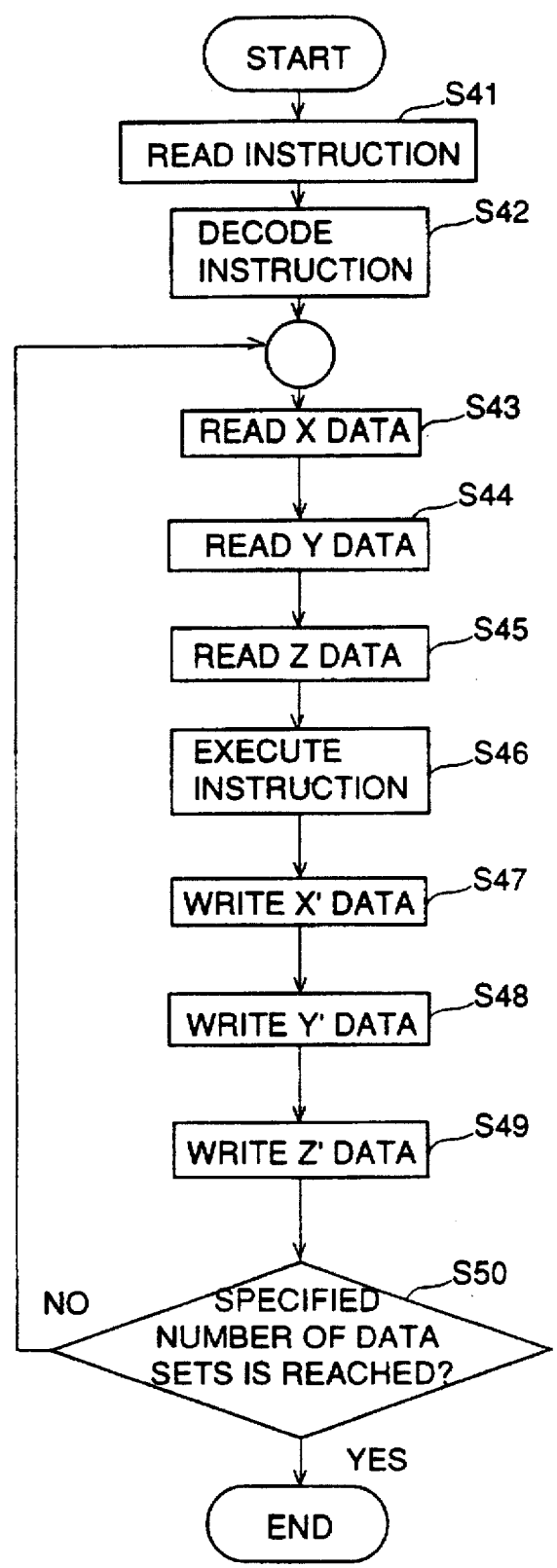
FIG. 11 is a flow chart for explaining an operation performed by the processor system in FIG. 9.

FIG. 11 shows a 3D object data processing operation performed by the processor system in FIG. 9. The steps S41 through S50 in FIG. 11 are the same as corresponding steps in FIG. 16, and a description thereof will be omitted. However, in this fourth embodiment, repeating the data processing operation in FIG. 11 eight times for processing the eight sets of the edge data is sufficient. This is different from the case of the conventional processor system in FIG. 16.

To compare a total time needed for generating 8 sets of the output data in this embodiment with the case of the conventional processor system in FIG. 16, suppose that the reading of a piece of the input data takes 1 clock cycle, the decoding takes no clock cycle, the data processing takes 44 clock cycles, and the reading and writing of a piece of the output data takes 1 clock cycle. A time needed for generating a set of the output data related to one edge of the regular hexahedron would be 50 (=3+44+3) clock cycles. Accordingly, a total time needed for generating 8 sets of the original output data related to all the edges of the regular hexahedron would be 400 (=50×8) clock cycles.

Figure 12:
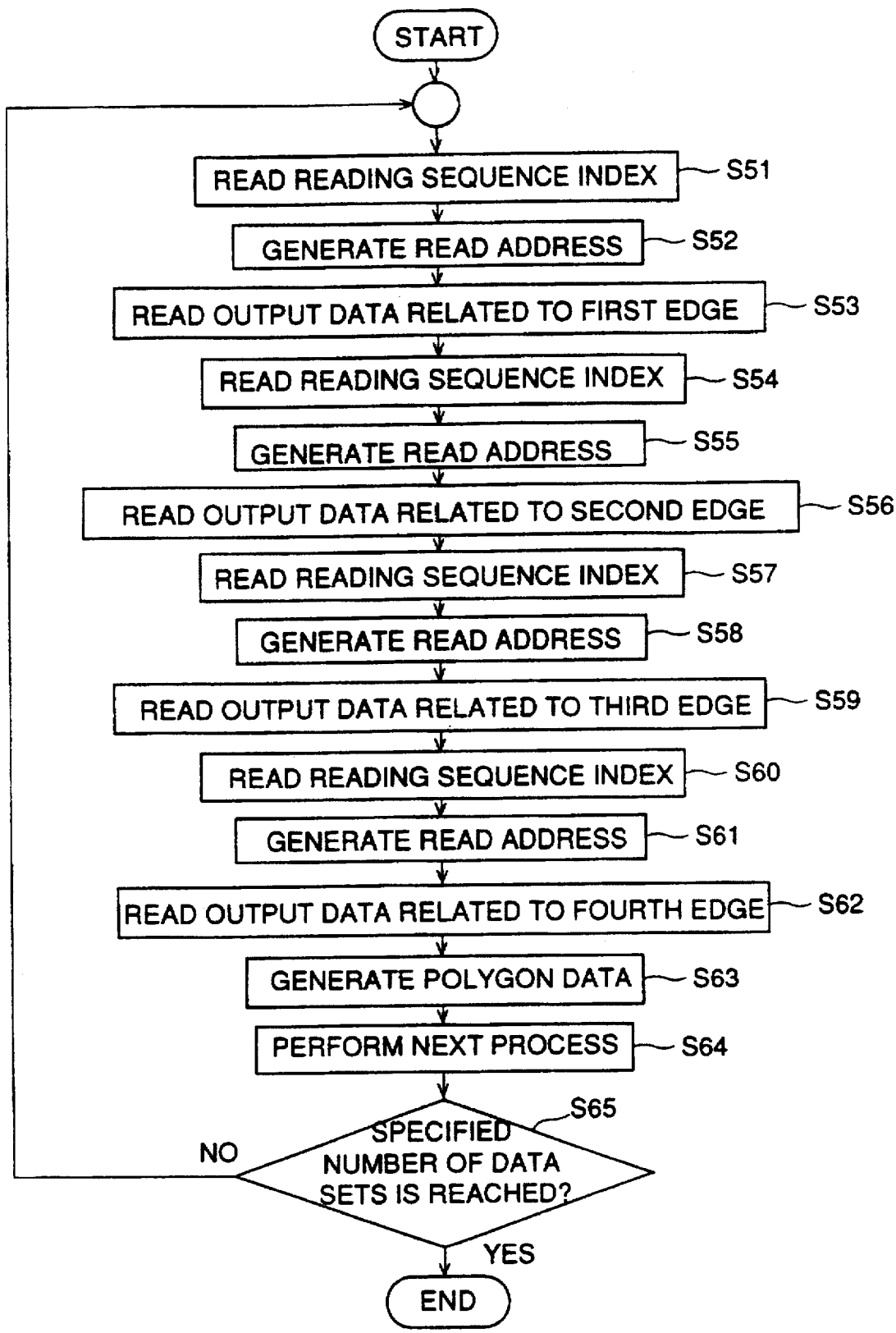
FIG. 12 is a flow chart for explaining an operation performed by a next-process processor in FIG. 9.

FIG. 12 shows a 3D object data processing operation performed by the next-process processor 10. The next-process processor 10, in step S51 in FIG. 12, reads out one of the reading sequence indexes stored in the data structure memory 16. Step S52 generates a read address indicating a location of the output data memory 3 from which a set of the original output data is read out, based on the reading sequence index (related to a first edge of one polygon of the regular hexahedron). Step S53 reads a set of the original output data related to the first edge from the output data memory 3 in accordance with the generated read address.

In FIG. 12, steps S54 through S56, steps S57 through S59, and steps S60 through S62 are performed in a manner similar to the above-described steps S51 through S53, in order to read out three sets of the original output data related to second through fourth edges of the polygon from the output data memory 3.

After the steps S51 through S62 are performed, step S63 generates polygon data from the four sets of the original output data related to that polygon of the regular hexahedron. Step S64 performs a next process (e.g. a 3D image generating process) based on the generated polygon data.

After the step S64 is performed, step S65 detects whether a specified number of all the sets of the original output data to be processed is reached. If the result at the step S64 is negative, the preceding steps starting from the above step S51 are repeated. If the result at the step S64 is affirmative, the 3D object data processing operation, shown in FIG. 12, is ended.

In the above-described fourth embodiment, only the original input data including no duplicate data is stored in the input data memory 1, and only the original output data including no duplicate data is stored in the output data memory 3. The storage capacity of each of the memories 1 and 3 can be reduced, thereby the throughput of the processor system is increased. When the output data is read from the output data memory 3 for supplying the output data to the next-process processor 10, the reading sequence index read from the data structure memory 16 is used to determine the sequence in which the sets of the output data are read from the output data memory 3.

In the above-described fourth embodiment, the step to detect whether the input data is the original input data or the duplicate input data, and the step to store the output data in the output data memory 3 in accordance with the result of the detection, which are required by the first through third embodiments, are not required.

Further, the present invention is not limited to the above described embodiments, and variations and modifications may be made without departing from the scope of the present invention.

What is claimed is:

1. A processor system which generates a number of sets of output data by processing a number of sets of predetermined input data including duplicate data in accordance with a predetermined operation, comprising:

an input data memory for storing the sets of predetermined input data to be processed, said predetermined input data including sets of original input data and sets of substitute duplicate input data defining sets of duplicate output data;

processing means for processing each set of said original input data from said input data memory, to generate sets of original output data;

an output data memory for storing the sets of original output data and sets of duplicate output data, each set of said duplicate output data being a duplicate of a corresponding set of the original output data;

an output data cache for storing the sets of the original output data which are output from said processing means when the input data read from the input data memory is detected as being the original input data; and switching control means for transferring the original output data stored in said output data cache into a location of said output data memory to store the duplicate output data when the input data read from the input data memory is detected as being the substitute duplicate input data, and for transferring the original output data output from said processing means into a location of said output data memory to store the original output data when the input data read from the input data memory is detected as being the original input data.

2. The processor system according to claim 1, wherein the sets of the original input data are stored in said input data memory at original locations thereof, and sets of a non-numeric value and a pointer address which partially substitute for the sets of duplicate input data are stored in said input data memory at locations of the duplicate input data.

3. The processor system according to claim 1, wherein said switching control means comprises a decoder for detecting whether the input data read from said input data memory is the duplicate input data or the original input data.

4. The processor system according to claim 1, wherein a plurality of pointer addresses which partially substitute for the sets of duplicate input data are stored in said input data memory, each of said pointer addresses indicating a specific location of said output data cache at which corresponding original output data is stored.

5. The processor system according to claim 1, wherein said switching control means comprises a multiplexer having inputs connected to an output of said processing means and to an output of said output data cache, and having an output connected to an input of said output data memory.

6. A processor system which generates a number of sets of output data by processing a number of sets of predetermined input data including duplicate data in accordance with a predetermined operation, comprising:

an input data memory for storing the sets of predetermined input data to be processed, said predetermined input data including sets of original input data and sets of substitute duplicate input data defining sets of duplicate output data;

processing means for processing each set of said original input data from said input data memory, to generate sets of original output data;

an output memory for storing the sets of original output data and sets of duplicate output data, each set of said duplicate output data being a duplicate of a corresponding set of the original output data;

a data register for temporarily storing a set of the original output data which is output from said output data memory when the input data read from the input data memory is detected as being the substitute duplicate input data; and switching control means for transferring the original output data temporarily stored in said data register into a location of said output data memory to store the duplicate output data when the input data read from the input data memory is detected as being the substitute duplicate input data, and for transferring the original output data output from said processing means into a location of said output data memory to store the original output data when the input data read from the input data memory is detected as being the original input data.

7. The processor system according to claim 6, wherein the sets of the original input data are stored in said input data memory at original locations thereof, and sets of a non-numeric value and a pointer address which partially substitute for the sets of duplicate input data are stored in said input data memory at locations of the duplicate input data.

8. The processor system according to claim 6, wherein said switching control means comprises a decoder for detecting whether the input data read from said input data memory is the duplicate input data or the original input data.

9. The processor system according to claim 6, wherein a plurality of pointer addresses which partially substitute for the sets of duplicate input data are stored in said input data memory, each pointer address indicating a specific location of said output data memory at which corresponding original output data is stored.

10. The processor system according to claim 6, wherein said switching control means comprises a multiplexer having inputs connected to an output of said processing means and to an output of said data register, and having an output connected to an input of said output data memory.

11. A processor system which generates a number of sets of output data by processing a number of sets of predetermined input data including duplicate data in accordance with a predetermined operation, comprising:

an input data memory for storing the sets of predetermined input data to be processed, said predetermined input data including sets of original input data and sets of duplicate input data, each set of the duplicate input data being indicated by a non-numeric value and a pointer address;

processing means for generating a set of output data by processing each set of said input data from said input data memory, said processing means generating sets of original output data from the sets of original input data;

an output data memory for storing all the sets of the output data including the sets of original output data and sets of duplicate output data, each set of said duplicate output data being a duplicate of a corresponding set of the original output data;

switching control means for transferring the duplicate input data included in the input data into a location of said output data memory to store said duplicate input data when the input data read from the input data memory is detected as being the duplicate input data, and for transferring the original output data output from said processing means into a location of said output data memory to store said original output data when the input data read from the input data memory is detected as being the original input data.

12. The processor system according to claim 11, wherein the sets of the original input data are stored in said input data memory at original locations thereof, and sets of a non-numeric value and a pointer address which partially substitute for the sets of duplicate input data are stored in said input data memory at locations of the duplicate input data.

13. The processor system according to claim 11, wherein said switching control means comprises a decoder for detecting whether the input data read from said input data memory is the duplicate input data or the original input data.

14. The processor system according to claim 11, wherein said switching control means comprises a multiplexer having an input connected to an output of said processing means, and having an output connected to an input of said output data memory.

15. A processor system which supplies a number of sets of output data including duplicate data to a next-process processor, said sets of output data being generated by processing a number of sets of predetermined input data in accordance with a predetermined operation, said processor system comprising:

an input data memory for storing sets of original input data included in the sets of predetermined input data to be processed;

processing means for generating a set of output data by processing each set of said original input data from said input data memory, said processing means generating sets of original output data from the sets of original input data;

an output data memory for storing the sets of original output data generated by said processing means, the sets of original output data being included in the sets of the output data; and a data structure memory for storing a plurality of reading sequence indexes, said reading sequence indexes being used by the next-process processor to allow the sets of output data including the sets of original output data and sets of duplicate output data to be supplied to the next-process processor, wherein said next-process processor comprises:
means for reading one of the reading sequence indexes from said data structure memory;
means for generating a read address indicating a location of said output data memory from which the original output data is read out, based on the reading sequence index read from said data structure memory; and
means for reading a set of the original output data from said output data memory in accordance with the read address generated.

* * * * *

UNITED STATES PATENT AND TRADEMARK OFFICE
CERTIFICATE OF CORRECTION

PATENT NO.    : 5,692,163
DATED         : November 25, 1997
INVENTOR(S)   : Masanobu FUKUSHIMA It is certified that error appears in the above-identified patent and that said Letter Patent is hereby corrected as shown below:

On the title page, Item "[54]": and Column 1, line 1,

Change "PROCESS SYSTEM WHICH GENERATES SETS OF OUTPUT DATA FROM SETS OF PREDETERMINED INPUT DATA WITH DUPLICATE DATA"

to --PROCESSOR SYSTEM WHICH GENERATES SETS OF OUTPUT DATA FROM SETS OF PREDETERMINED INPUT DATA WITH DUPLICATE DATA--

Signed and Sealed this

Thirty-first Day of March, 1998

Attest:

BRUCE LEHMAN

*Attesting Officer*    *Commissioner of Patents and Trademarks*